Patented Jan. 17, 1933

1,894,628

UNITED STATES PATENT OFFICE

JAMES A. MORTLAND AND HERBERT L. SMITH, OF TAMPA, FLORIDA

COMPOSITION OF MATTER

No Drawing.   Application filed January 14, 1931. Serial No. 508,805.

This invention relates to new and useful improvements in a composition of matter and more particularly to a plaster used in building constructions and in the manufacture of what is generally known as wall boards, for interior and exterior use.

The primary object of the invention is to provide an improved plaster which is fibered and which with the addition of sand and water thoroughly mixed produces the building plaster suitable for interior and exterior surfaces with no additional material necessary.

A further object of the invention resides in providing a plaster of the character mentioned which may be readily applied to use and which is not quick-setting and further one which will set faster in damp weather than the usually utilized lime plaster.

Still another object resides in providing a plaster which is easily manipulated and which forms a more perfect clinch or anchorage to the lath in building constructions.

A further object resides in providing a plaster which is fire-resistant, water-resistant, sound-deadening, an insulator and non-conductor of electricity.

With these and numerous other objects in view, our invention consists in the combination of ingredients as hereinafter more particularly referred to in the specification and claim.

Our improved composition comprises a mechanical mixture of Portland cement, finely ground so that not more than 15% residue may be retained on a screen having 186×186 meshes per square inch, and of finely ground lime stone or other suitable stone of a mineral nature used as a filler, the stone to be ground to such a state that not more than 15% residue may be retained on a screen having 100×100 meshes per square inch. These two ingredients are thoroughly mixed together until the interstices of the ground limestone, or other mineral filler used, is filled with the Portland cement, thus greatly increasing the effective cementitious properties of the cement. By separating the particles of cement, the setting action of said cement is retarded, allowing a greater range of manipulation when used as a mortar in plastering.

After the complete mixing of the cement and the ground limestone, or other mineral filler used, prepared fiber from the saw palmetto (*Inodes palmetto*) or the fiber from sugar cane (*Saccharum officinarum*) is added by stirring and agitating until the fiber is thoroughly incorporated with the other ingredients and formed into a uniform mixture. As stated, a prepared fiber is used and this fiber is prepared by shredding and grinding the same until it is a fine mass of short fibers free from dust.

The proportion of the constituent are by weight substantially, to a ton of 2000 lbs. as follows:

|  | Pounds |
|---|---|
| Portland cement | 675 |
| Ground stone, mineral filler | 1090 |
| Fiber, saw grass or sugar cane | 235 |
| Total | 2000 |

A fibered plaster is thus formed. This plaster, with the addition of one to two parts, by volume, of sand, thoroughly mixed with water, constitutes a building plaster suitable for interior and exterior surfaces, with no additional material necessary. Such a plaster may be readily applied and is not quick setting, the same being capable of setting faster in damp weather than lime plaster. This plaster is also capable of being readily and easily manipulated and forms a perfect clinch or anchorage to the lath and to the interstices of the lath, the same being fire resistant, crumbling only under extreme heat, water resistant, sound deadening and an insulator, the same also being a non-conductor of electricity. This composition may be molded or cast in forms and possesses the quality of being manipulated and formed with screeds or dies.

This composition may be used as a stucco plaster with no added materials other than the sand required and desired. Coloring matter, such as hydrated lime, yellow ocher, iron oxide, or the like, may be added, subject to the choice of color desired.

This plaster, when thoroughly mixed with small amounts of water is a material which may be readily cast or molded into wall boards or building blocks by means of hydraulic presses. Such a plaster or wall board may be nailed or otherwise worked the same as a wood board. Such plaster boards may supplant the use of lath, expanded metal or plaster bases and the plaster in the finishing of a building, either interior or exterior or both.

As stated in the objects of the invention and in the aforesaid description, an important feature of the invention is the separating of the particles of cement when the ground limestone is mixed therewith which retards the setting action of the cement and allows a greater range of manipulation when used as a mortar in plastering. This particular plaster is lighter in weight and more effective and durable than similar compositions now in use.

From the foregoing description of our improved composition of matter and the method of making same, the application thereof to use will be readily understood and it will be seen that we have provided a simple, comparatively inexpensive and very efficient means for carrying out the numerous objects of the invention. Slight changes in form and proportion of the ingredients may be used without departing from the spirit or sacrificing any of the principles of the invention.

Having thus described the invention what is claimed is:

A composition of matter consisting of finely ground Portland cement mixed with finely ground stone, the ground stone being coarser than the cement and the cement filling interstices of the stone and forming with the stone a dense composition, and a mass of shredded-dust free vegetable fibers selected from the group consisting of saw palmetto and sugar cane, the ingredients being in substantially the following proportions: Portland cement 675 pounds, ground stone 1090 pounds and vegetable fiber 235 pounds.

In testimony whereof we affix our signatures.

JAMES A. MORTLAND.
HERBERT L. SMITH.